(No Model.)
F. C. WHITCOMB.
DIE MILLING MACHINE.
No. 361,851. Patented Apr. 26, 1887.
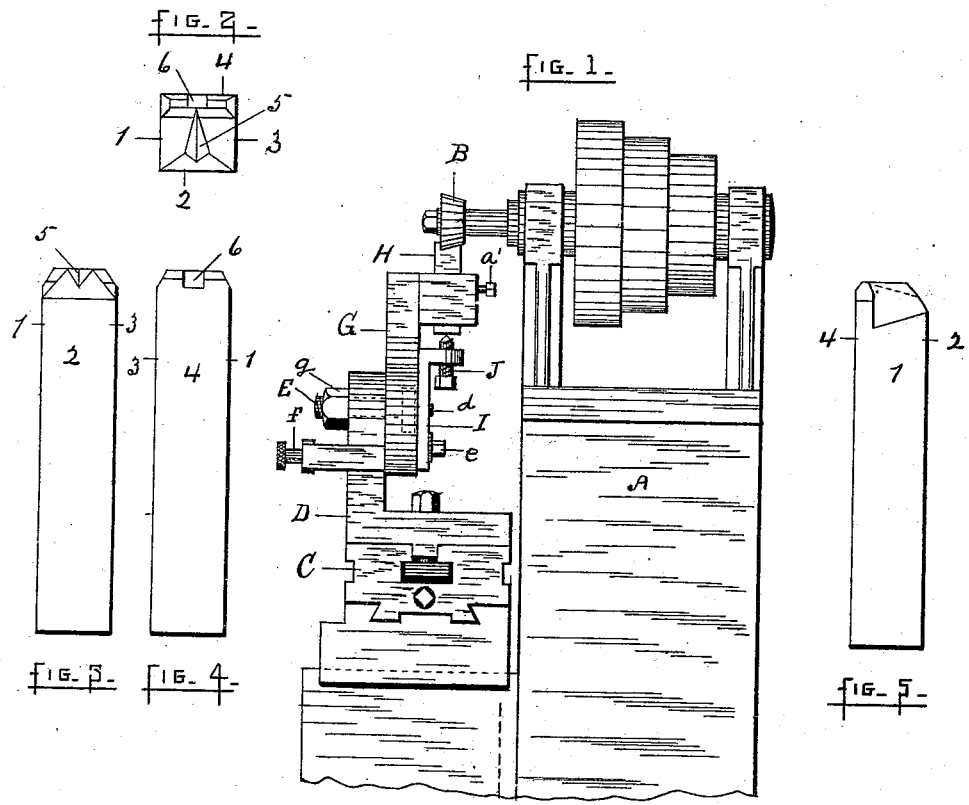
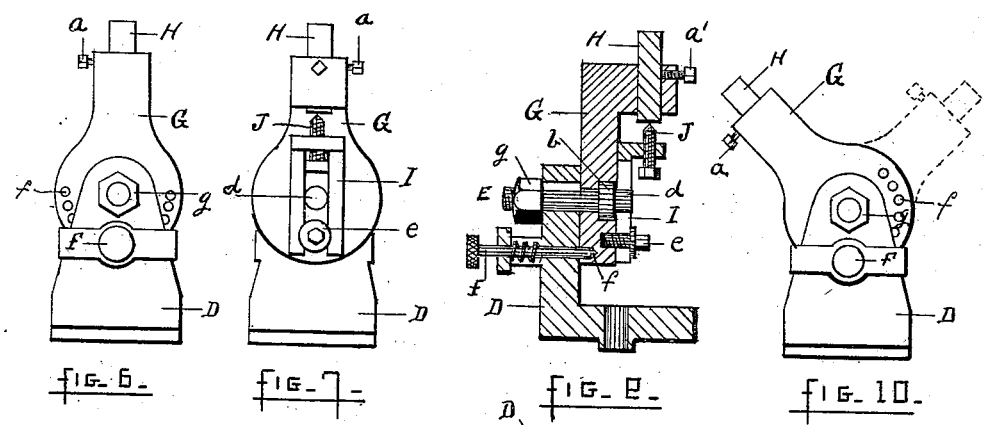
Witnesses
Rufus B. Fowler
D. W. Carter
Inventor
F. C. Whitcomb

UNITED STATES PATENT OFFICE.

FERNANDO C. WHITCOMB, OF WORCESTER, MASSACHUSETTS.

DIE-MILLING MACHINE.

SPECIFICATION forming part of Letters Patent No. 361,851, dated April 26, 1887.

Application filed February 17, 1886. Serial No. 192,279. (No model.)

*To all whom it may concern:*

Be it known that I, FERNANDO C. WHITCOMB, a citizen of the United States, residing at Worcester, in the county of Worcester and State of Massachusetts, have invented a new and useful Machine for Milling Nail-Machine Dies, of which the following is a specification.

My invention relates to that part of a milling-machine which is employed in holding and maintaining the steel bars to be milled in forming the cutting or holding dies of machines for making wire nails; and it consists in providing a blank-holder adapted to present the die-blank to the action of the cutting-tool at the various angles required to form the die, as hereinafter described; also, in providing means by which a uniform length of the dies is secured.

The mechanism embodying my invention is illustrated in the accompanying drawings, in which—

Figure 1 is an elevation of a portion of a milling-machine. Fig. 2 shows an end view of one of the cutting-dies of a wire-nail machine. Figs. 3, 4, and 5 show different sides of the same. Figs. 6, 7, 8, and 9 show, respectively, front, rear, top, and sectional views of the adjustable mechanism for holding the die; and Fig. 10 is a front view of the same with the holder placed at an angle with its supporting-base.

Similar letters refer to similar parts in the several views.

A denotes the stand of a milling-machine, and B the revolving cutter.

C is a carriage or bed sliding in ways transversely to the axis of the rotating cutter B. Upon the bed C, I fasten a stand, D, carrying a bolt, E, and a sliding pin, F. Upon the bolt E, I pivot a plate, G, with a socket at the top to receive a steel bar, H, to be milled, in which it is firmly held by the binding-screws $a\ a'$, which press the sides 1 and 2 of the steel bar against the sides of the socket. The bolt E has a head, $b$, which retains the pivoted plate G. On the plate G a bar, I, with a longitudinal slot, slides on the pin $d$, and $e$ is a screw by which it is held, and it carries at its top an adjustable screw, J, against which the lower end of the bar H rests, thus insuring a uniform length of the bars.

In the plate G are a series of concentric holes, $f$, Fig. 10, into which the sliding pin F enters, adjusting the plate G at the desired angle to present the bar H to the rotating cutter, after which the nut $g$ is tightened, securely holding the plate G in position.

The operation of milling a die is as follows: The steel bar H is placed in the socket $h$, its lower end resting against the screw J, and held by the screws $a\ a'$. The plate G, and bar H in the upright position shown in Figs. 6 and 7, is passed beneath a plain cylindrical cutter, which squares the end of the bar. The plate G and bar H are then inclined to form the triangular cut 5, and the bar is passed beneath a properly V-shaped cutter. The bar is then inclined in the opposite direction at the right angle to form the square cut 6, and the bar again passed beneath a properly-shaped cutter. The bar H is then turned half-way round, so as to press the sides 2 and 3 against the sides of the socket by the screws $a\ a'$, and the plate G inclined, as seen in Fig. 10, and passed beneath the beveled cutter B, forming the cut on side 1. The angle of the plate G is then reversed, as shown by broken lines in Fig. 10, and the cut on side 3 formed. The remaining beveled surfaces on the die may be similarly cut in the milling-machine, or they may be formed by a file. It will be seen that the two sides of the socket $h$, opposite the binding-screws $a$ and $a'$, form a gage, against which the two contiguous sides of the steel bars are held by the screws $a$ and $a'$, thereby securing uniformity in the several dies, which is a very desirable feature, as the opposing faces of each pair of dies must exactly correspond when placed in the machine. The method of forming a single die has been described; but in practice it is usual to form several dies at a time, and when the holding device is placed in an upright position all the bars are squared, a uniform length being secured by the end gage, consisting of sliding bar I and adjusting-screw J. Each of the several cuts is then formed on all the bars to be milled, thereby avoiding the frequent changing of the cutters.

I do not confine myself to any special form of milling-machine, as the mechanism employed in rotating the cutter, or for adjusting the position of the carriage or bed C, or for traversing it past the cutter, form no part of my present invention; neither do I confine myself to any special form or shape of dies, as many forms of both cutting and holding dies may readily be made with my device.

What I claim as my invention, and desire to secure by Letters Patent, is—

1. In a machine for milling nail-machine dies, the combination, with a revolving cutter, of a pivoted blank-holder pivoted on an axis parallel with the axis of the revolving cutter and having a radial socket to receive the die-blank, said socket having two of its sides fixed to form a rest for two contiguous sides of the die-blank, and clamping devices for maintaining the die-blank against the fixed sides of the socket, substantially as described.

2. In a machine for milling nail-machine dies, the combination, with a revolving cutter, of a pivoted blank-holder pivoted on an axis parallel with the axis of the revolving cutter and having a radial socket to receive the die-blank, substantially as described, and an adjustable rest, against which the end of the die-blank rests, as and for the purpose described.

3. In a machine for milling nail-machine dies, the combination, with a revolving cutter, of a pivoted blank-holder having a radial socket to receive the die-blank, said socket having two fixed sides forming a rest for two contiguous sides of the die-blank, an adjustable rest for the end of the die-blank, and means, substantially as described, for maintaining the pivoted holder at the desired angle, substantially as described.

4. The combination, with a rotating cutter, of a holding device consisting of a stand, D, a plate, G, pivoted on said stand and having clamping devices for holding the bar to be milled, and an end gage consisting of a sliding bar, I, and an adjusting-screw, J, as described, and for the purpose set forth.

F. C. WHITCOMB.

Witnesses:
D. W. CARTER,
RUFUS B. FOWLER.